United States Patent [19]

Leyrer et al.

[11] Patent Number: 4,880,718
[45] Date of Patent: Nov. 14, 1989

[54] ELECTROPHOTOGRAPHIC RECORDING ELEMENT WITH ISOINDOLENINE DERIVATIVES

[75] Inventors: Reinhold J. Leyrer, Ludwigshafen; Peter Neumann, Mannheim, both of Fed. Rep. of Germany

[73] Assignee: BASF Aktiengesellschaft, Ludwigshafen, Fed. Rep. of Germany

[21] Appl. No.: 274,969

[22] Filed: Nov. 22, 1988

[30] Foreign Application Priority Data

Nov. 28, 1987 [DE] Fed. Rep. of Germany ....... 3740420

[51] Int. Cl.$^4$ .......................... G03G 5/06; G03G 5/14
[52] U.S. Cl. ........................................ 430/58; 430/59; 430/77; 430/78
[58] Field of Search ....................... 430/58, 59, 76, 77, 430/78

[56] References Cited

U.S. PATENT DOCUMENTS

| | | | |
|---|---|---|---|
| 3,041,165 | 6/1962 | Sus et al. | 430/74 |
| 3,180,729 | 4/1965 | Klupfel et al. | 430/76 |
| 3,257,203 | 6/1966 | Sus et al. | 430/77 |
| 4,115,116 | 9/1978 | Stolka et al. | 430/59 |
| 4,150,987 | 4/1979 | Anderson et al. | 430/59 |
| 4,278,747 | 7/1981 | Murayama et al. | 430/82 |
| 4,367,273 | 1/1983 | Murayama et al. | 430/56 |
| 4,424,266 | 1/1984 | Kurihara et al. | 430/59 |
| 4,465,753 | 8/1984 | Tanaka et al. | 430/78 X |
| 4,529,678 | 7/1985 | Ohta | 430/58 |
| 4,714,779 | 12/1987 | Turner et al. | 564/330 |

FOREIGN PATENT DOCUMENTS

| | | |
|---|---|---|
| 1146794 | 5/1983 | Canada . |
| 57-185045 | 11/1982 | Japan ..................... 430/78 |
| 60-177354 | 9/1985 | Japan ..................... 430/78 |
| 60-191265 | 9/1985 | Japan ..................... 430/78 |
| 62-289846 | 12/1987 | Japan ..................... 430/78 |
| 63-249151 | 10/1988 | Japan ..................... 430/78 |
| 2088074 | 6/1982 | United Kingdom . |

*Primary Examiner*—Roland E. Martin
*Attorney, Agent, or Firm*—Keil & Weinkauf

[57] ABSTRACT

An electrophotographic recording element comprising
(A) an electrically conducting base and
(B) at least one photoconductive layer consisting essentially of
 ($b_1$) at least one binder,
 ($b_2$) at least one sensitizer which on exposure of layer (B) generates charge carriers and which is selected from the group of the isoindolenine dyes of the general structure I

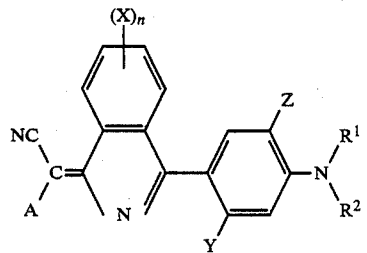

where the index and the variables have specified meanings,
 ($b_3$) at least one index and the variables have specified the generated charge carriers and optionally
 ($b_4$) additives,
is useful for reprographic purposes, for producing printing plates, in particular offset plates, and for producing photoresists.

22 Claims, No Drawings

ELECTROPHOTOGRAPHIC RECORDING ELEMENT WITH ISOINDOLENINE DERIVATIVES

The present invention relates to a novel electrophotographic recording element comprising
(A) an electrically conducting base and
(B) at least one layer consisting essentially of
  ($b_1$) at least one binder,
  ($b_2$) at least one sensitizer which on exposure of layer (B) generates charge carriers,
  ($b_3$) at least one photoconductor which transports the charge carriers and optionally
  ($b_4$) additives.

The present invention also relates to novel isoindolenine dyes.

As is known, such an electrophotographic recording element, besides base (A) and layer or layers (B), may contain further layers which are useful to the functioning of the recording material. Moreover, in the novel recording element the charge carrier generator compounds or sensitizers ($b_2$) may be present as a separate layer or in a separate layer besides a layer of binders ($b_1$), charge carrier transporter compounds ($b_3$) and any additives ($b_4$), in which case this double layer must then be regarded as a whole in terms of its function as a layer (B). Layers (B) of this kind as well as those which contain all components ($b_1$), ($b_2$), ($b_3$) and optionally ($b_4$) together are therefore referred to hereinafter in keeping with their function as photoconductive layer (B) for short.

Electrophotographic recording elements incorporating an electrically conducting base (A) and photoconductive layers (B) are known for example from EP-A0,131,215, EP-B-0,031,481, EP-A-0,150,419, EP-A-0,162,216, EP-A-0,156,308, EP-A-0,131,292, EP-A-0,152,889 or EP-A0,198,488. These recording elements are used to produce offset printing plates or printed circuits (circuit boards) or in photocopying.

To this end, the photoconductive layer (B) of the recording element is charged electronically positive or negative, for example by means of a corona discharge. Thereafter the electrically charged layer (B) is subjected to imagewise exposure with actinic light which, depending on the sensitizer ($b_2$) used, will be ultraviolet, visible or infrared light. As a result of exposure, the photoconductive layer (B) becomes electrically conducting in its exposed areas, so that the previously generated electrostatic charge can drain away in these areas via the electrically conducting base (A). This gives a latent electrostatic image on the recording element, which can be developed by means of suitable liquid or solid toners into a visible image. This technique of imagewise information recording is generally also referred to as xerography, the physical process underlying the recording process being known under the name Carlson process.

After the electrostatic image has been tonered, such a recording element can be further processed in different ways. For example, the toner image can be transferred from the recording element to another base, for example paper, and be fixed thereon to obtain a positive photocopy of the original. This procedure can be carried out more or less often, depending on the life of the recording element. To produce offset printing plates, by contrast, the toner image is fixed on the photoconductive layer (B) itself by heating. Thereafter the unexposed and therefore toner-free areas of the photoconductive layer (B) are dissolved away by means of suitable liquid media, which are also referred to as developers. An offset printing plate produced in this way, like a conventionally produced offset printing plate, generally accepts oily printing ink in its hydrophobic toner image areas and water in its cleared, hydrophilic areas, so that it is suitable for offset-type printing processes. To produce photoresists, use is made of processes which basically correspond to the manufacturing process for offset printing plates.

Parameters which are known to have significant effect on the reproduction quality of such recording elements and of their photoconductive layers (B) are the dark conductivity, which should ideally be low, the electrostatic chargeability, which should be high, and the sensitivity to actinic light, which should be high, combined with good electrokinetic properties, meaning in general a very rapid voltage drop on exposure down to or almost down to the original electrostatic potential before charging. This voltage drop is also referred to as the photo-induced voltage drop or photodrop for short. All these parameters together determine in advance whether or not a recording element will be capable of delivering highcontrast toner images which are true to the original down to their finest image elements within a very short time.

In the matter of mutually adapting the significant parameters to one another and to the actinic light source used for the imagewise exposure of photoconductive layer (B), the charge carrier generator compounds or sensitizers ($b_2$) play a very decisive part. The always great importance of sensitizers ($b_2$) has beenincreased even more by the further development of conventional exposure light sources and the new development of laser light sources. Progress in this field has in the meantime led to exposure units which permit the rapid and exact imagewise exposure of electrophotographic recording elements by means of computer-controlled lasers, in particular semiconductor lasers. To be able to utilize in full the advantages of this promising method of exposure it is however necessary to assume that the electrophotographic recording elements have a range of properties which is not offered at all or not to a sufficient extent by conventional recording elements. More particularly, owing to the short laser pulses, the absorption of the light energy by the photoconductive layer (B) and the consequent photodrop must take place particularly rapidly, i.e. within the nanosecond range, and in this time interval too the law $$I \times t = \text{constant} \quad (I = \text{Light intensity}; t = \text{time})$$

must be valid.

Yet these strict requirements have hitherto not been met to the desired extent by existing electrophotographic recording elements containing as sensitizers one or more dyes of the classes of the triarylmethanes, xanthenes, cyanines, azo dyes, phthalocyanines, isoindolines or perylenetetracarboxylic acid derivatives. Consequently, in order to obtain good-quality reproduction, it is still frequently necessary to expose existing recording elements in a conventional manner and hence forgo the particular advantages of the laser light exposure method. If the existing, electrophotographic recording elements are nonetheless subjected to imagewise exposure with laser light, they have disadvantages.

For instance, they are not or only to a very limited extent suitable for economical long-life fast-response laser light photocopiers or for the production of high-quality faithful offset printing plates having a long press life or of high-quality faithful photoresists having high resistance to etching agents by one laser light exposure method. These disadvantages do of course become fully manifest in the products which in the final analysis are to be produced by means of the electrophotographic recording elements; for instance, the photocopies in question or the printed copies are obtained not only in lesser quality but also in a comparatively short run, and electric circuits produced using existing electrophotographic resists frequently show so many errors of reproduction that they do not meet practical requirements.

It is an object of the present invention to find novel electrophotographic recording elements which no longer have the disadvantages of existing recording elements. More particularly, the novel recording elements not only shall have an excellent reprographic range of properties on imagewise exposure with conventional light sources but they shall also be accessible to imagewise exposure with laser light, and thereby give excellent photocopies, offset printing plates and photoresists.

It is another object of the present invention to find novel isoindolenine dyes which are particularly suitable for use as sensitizers ($b_2$).

We have found that these objects are achieved with an electrophotographic recording element comprising
(A) an electrically conducting base and
(B) at least one layer consisting essentially of
  ($b_1$) at least one binder,
  ($b_2$) at least one sensitizer which on exposure of layer (B) generates charge carriers,
  ($b_3$) at least one photoconductor which transports the generated charge carriers and optionally
  ($b_4$) additives,
at least one of the sensitizers ($b_2$) of the novel recording element being selected from the group of the isoindolenine dyes of the general structure I

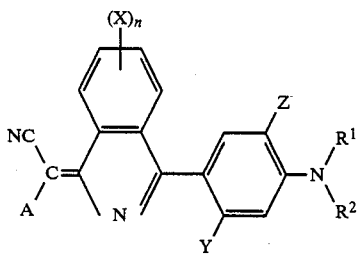

where the index and the variables are defined as follows:
A is cyano, carbo-$C_1$-$C_4$-alkoxy, carbamoyl, N-$C_1$-$C_4$-alkylcarbamoyl where the alkyl may be substituted by $C_1$-$C_4$-alkoxy, N-phenyl-carbamoyl where the phenyl may be substituted by $C_1$-$C_4$-alkyl or $C_1$-$C_4$-alkoxy, or is acetyl, benzoyl, 4-nitrophenyl or 4-cyanophenyl,
X is hydrogen, chlorine, $C_1$-$C_4$-alkyl or $C_1$-$C_4$alkoxy, it being possible when n =2 for the substituents to be identical or different,
n is 1 or 2,
$R^1$ is hydrogen, methyl, ethyl or 2-hydroxyethyl and $R^2$ is phenyl, $C_1$-$C_4$-alkyl-or $C_1$-$C_4$-alkoxysubstituted phenyl or cyclohexyl, or $R^1$ is hydrogen and
$R^2$ is $C_1$-$C_4$-alkyl, or
$R^1$ and $R^2$ are each $C_1$-$C_6$-alkyl, $C_1$-$C_4$-alkyl which is substituted by chlorine, cyano, hydroxyl, $C_1$-$C_4$-alkoxy, phenoxy, $C_2$-$C_5$-alkanoyloxy, which may be substituted by $C_1$-$C_4$-alkoxy or phenoxy, or carbo-$C_1$-$C_4$-alkoxy, or are each allyl or phenyl-$C_1$-$C_4$-alkyl, or the group

is a saturated or partially unsaturated heterocyclic five- or six-membered ring which may additionally contain an oxygen atom or a further nitrogen atom as a ring member,
Y is hydrogen, hydroxyl, methyl or ethyl,
Y is

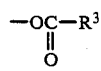

where $R^3$ is linear or branched $C_1$-$C_{12}$-alkyl, phenyl or $C_1$-$C_4$-alkyl-or $C_1$-$C_4$-alkoxy-substituted phenyl,
Y is

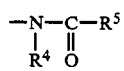

where $R^4$ is hydrogen or $C_1$-$C_4$-alkyl and $R^5$ has the following meanings: hydrogen, linear or branched $C_1$-$C_{12}$-alkyl, trifluoromethyl, chloromethyl, $C_1$-$C_4$-alkoxymethyl, phenoxymethyl, where in the phenoxy 1 or 2 hydrogen atoms may be replaced by chlorine, methoxy, nitro or $C_1$-$C_4$-alkyl, and if there are two substituents these may be identical or different, phenylthiomethyl phenyl may be substituted by $C_1$-$C_4$-alkyl, benzyl, phenylethyl, $C_3$-$C_7$-cycloalkyl, phenyl, $C_1$-$C_{12}$-alkyl-, $C_1$-$C_{12}$-alkoxy-or nitro—substituted phenyl, $H_5C_6$-CH=CH-, -$CH_2$-PO($OR^6$)$_2$, where $R^6$ is $C_1$-$C_4$-alkyl, or
Y is

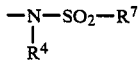

$R^4$ is as defined above and $R^7$ is $C_1$-$C_{12}$-alkyl, phenyl or $C_1$-$C_{12}$-alkylphenyl, or
Y is N-$C_1$-$C_4$-alkylamino when $R^1$ and $R^2$ are each $C_1$-$C_4$-alkyl, or
Y is N,N-di-$C_1$-$C_4$-alkylamino, N-pyrrolidinyl, N-piperidinyl or N-morpholinyl, when

has the same meaning, and
Z is hydrogen or if $R^1$ and $R^2$ are each $C_1$-$C_4$alkyl or allyl and Y is

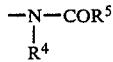

methoxy or ethoxy.

We have also found novel isoindolenine dyes Ia of the general formula Ia

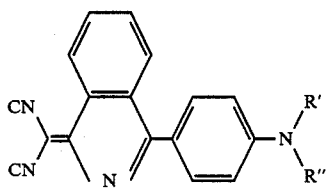

where the group

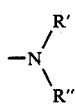

is a partially unsaturated heterocyclic five- or six-membered ring which may additionally contain an oxygen atom or a further nitrogen atom as a ring member, the group

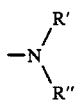

preferably being a substituted or unsubstituted $\Delta^2$-pyrazolin-1-yl radical.

An essential constituent of the multilayered electrophotographic recording element according to the invention is the novel photoconductive layer (B).

The novel photoconductive layer (B) contains one or more binders ($b_1$), one or more charge carrier generator compounds or sensitizers ($b_2$) and one or more charge carrier transporter compounds or photoconductors ($b_3$) side by side together.

Or the novel photoconductive layer (B) contains the sensitizer(s) in a separate layer, so that the novel photoconductive layer (B) is a double layer.

Which novel photoconductive layer (B) is chosen for constructing the recording elements according to the invention depends first and foremost on the intended use of the recording elements.

The essential constituent of the novel photoconductive layer (B) is the sensitizer ($b_2$). It comprises one or more isoindolenine dyes of the general formula I where the indices and the variables are as defined in the statement of claim and which hereinafter will be referred to as isoindolenine dyes I or Ia for short.

Besides acetyl, benzoyl, 4-nitrophenyl, 4-cyanophenyl, carbamoyl and cyano, other suitable substituents A comprise the following radicals:

(a) carbo-$C_1$-$C_4$-alkox such as carbomethoxy, carboethoxy, carbo-n-propoxy, carboisopropoxy, carbo-n-butoxy and carboisobutoxy;

(b) N-alkylcarbamoyl which may be substituted in the alkyl, such as methyl-, N-ethyl-, N-propyl-, N-butyl-, N-(3-methoxypropyl)-, N-(3-ethoxypropyl)-, N-(3-propoxypropyl)- and N-(3-butoxypropyl)-carbamoyl;

(c) N-phenylcarbamoyl which may be substituted in the phenyl, such as N-phenyl-, N-(4-methylphenyl)-, N-(2-methylphenyl)-, N-(4-ethoxyphenyl)-, N-(4-isopropylphenyl)-, N-(4-isobutylphenyl)-, N-(4-tert.-butylphenyl)-, N-(4-methoxyphenyl)-, N-(4-ethoxyphenyL)- and N-(4-butoxyphenyl)-carbamoyl.

Of these, cyano is the preferred substituent A.

Examples of suitable substituents X are chlorine, methyl, ethyl, methoxy, ethoxy and butoxy, with n being 1 or 2. Preferably, X is hydrogen.

Examples of suitable substituents $R^1$ aside from hydrogen are methyl, ethyl and 2-hydroxyethyl when $R^2$ is cyclohexyl, phenyl or substituted phenyl such as 4-methylphenyl, 4-ethylphenyl, 4-methoxyphenyl, 4-ethoxyphenyl, -butoxyphenyl, 4-isopropylphenyl. When R1 is hydrogen, R2 is also C1-C4-alkyl, such as methyl, ethyl, propyl, i-propyl, butyl, i-butyl or tert.-butyl. Further specific examples of suitable substituents R1 and R2 are:

(d) substituted or unsubstituted C1-C6-alkyl such as methyl, ethyl, n-propyl, n-butyl, pentyl, hexyl, 2chloroethyl, 2-cyanoethyl, 2-hydroxyethyl, 2-ethoxyethyl, 2-propoxyethyl, 2-butoxyethyl, 2-phenoxyethyl, 2-(ethanoyloxy)ethyl, 2-(propanoyloxy)ethyl, 2-(butanoyloxy)ethyl, 2-(pentanoyloxy)ethyl, 2-(methoxyethanoyloxy)ethyl, 2-(ethoxyethanoyloxy)ethyl, 2(phenoxyethanoyloxy)ethyl, 2-(carbomethoxy)ethyl, 2(carboethoxy)ethyl, 2-(carbobutoxy)ethyl and 2(carbopropoxy)ethyl;

(e) allyl and phenyl-$C_1$-$C_4$-alkyl such as benzyl, $\beta$-phenylethyl, $\beta$-phenylpropyl, $\alpha$-phenylpropyl and phenylbutyl; or (f) the group

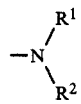

is a saturated or partially unsaturated 5- or 6-membered heterocyclic radical, such as N-pyrrolidinyl, N-piperidinyl, N-morpholinyl, N-piperazinyl, N'-$C_1$-$C_4$-alkylpiperazinyl with methyl, ethyl, propyl or butyl as the alkyl radical on the N'atom, pyrazolidin-1-yl, $\Delta^2$-3-methylpyrazolin-1-yl, $\Delta^2$-3,5,5-trimethylpyrazolin-1-yl, $\Delta$2-3-methyl-5-phenylpyrazolin-1-yl, $\Delta^3$-3,5-diphenylpyrazolin-1-yl and N-imidazolyl.

Examples of suitable substituents Y aside from hydrogen, hydroxyl, methyl and ethyl are (g)

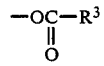

with $R^3$ =methyl, ethyl, propyl, butyl, hexyl, 1-ethylphenyl, heptyl, nonyl, undecyl, dodecyl, phenyl, 4-methoxyphenyl, 4-ethylphenyl, 4-methoxyphenyl and 4-ethoxyphenyl;

(h)

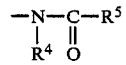

with $R^4$ = $C_1$-$C_4$-alkyl such as methyl, ethyl, propyl or preferably hydrogen and $R^5$ =hydrogen or ($\alpha$) $C_1$-$C_{12}$-alkyl such as methyl, ethyl, n-propyl, isopropyl, butyl, isobutyl, 2-methylpropyl, tert.-butyl, n-pentyl, 2,2- dimethylpropyl, 1-methylbutyl, 1-ethylpropyl, 1,1-dimethylpropyl, n-hexyl, 1,1-dimethylbutyl, 1,3-dimethylbutyl, heptyl, 1-ethyl-pentyl, 1-propyl butyl, 2,4-dimethylpentyl, octyl, nonyl, decyl, undecyl, 1,1-dimethylnonyl, dodecyl;

(β) alkoxymethyl, phenoxymethyl and phenylthiomethyl such as methoxymethyl, ethoxymethyl, propoxymethyl, butoxymethyl, phenoxymethyl, 2-, 3- and 4-isobutylphenoxymethyl, 4-tert.-butyl-2-methylphenoxymethyl, 2,3-dimethylphenoxymethyl, 2,4-dimethylphenoxymethyl, 2,5dimethylphenoxymethyl, 3,5-dimethylphenoxymethyl, 3,4dimethylphenoxymethyl, 2-, 3- and 4-chlorophenoxymethyl, 4-nitrophenoxymethyl, phenylthiomethyl, 4-methylphenylthiomethyl, 4-tert.-butylphenylthiomethyl, (γ) $C_3$-$C_7$-cycloalkyl such as cyclopropyl, cyclobutyl, cyclopentyl, cyclohexyl and cycloheptyl, (δ) phenyl, alkyl-, alkoxy- or nitro-substituted phenyl such as 2-, 3- and 4-methylphenyl, 2-, 3- and 4-ethylphenyl, 2-, 3- and 4-n- or i-propylphenyl, 2-, 3- and 4-n- or i-butylphenyl, 4-dodecylphenyl, 4-methoxyphenyl, 4-ethoxyphenyl, 4-n- or i-propoxyphenyl and 4-n- or i-butoxyphenyl; (ε) a radical of the formula —$CH_2$—$PO(OR^6)_2$ with $R^6$=methyl, ethyl, n- or i-propyl and n- or i-butyl, besides the other groups mentioned for $R^5$, trifluoromethyl, chloromethyl, benzyl, phenylethyl and $C_6H_5$-CH=CH-;

(i)

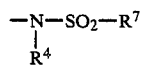

with $R^4$=$C_1$-$C_4$-alkyl such as methyl, ethyl and propyl or preferably hydrogen and $R^7$=

(α) $C_1$-$C_{12}$-alkyl such as methyl, ethyl, propyl, butyl, pentyl, hexyl, octyl, nonyl, decyl and dodecyl or (β) phenyl, $C_1$-$C_{12}$-alkyl-substituted phenyl such as 2-, 3- and 4-methylphenyl, 2-, 3- and 4-ethylphenyl, 2-, 3- and 4-isopropylphenyl, 2-, 3- and 4-isobutylphenyl, 4-pentylphenyl, 4-hexylphenyl, 4-octylphenyl, 4-nonylphenyl, 4-decylphenyl and 4-dodecylphenyl.

Y can further be $C_1$-$C_4$-alkylamino such as methylamino, ethylamino, propylamino and butylamino if $R^1$ and $R^2$ are each $C_1$-$C_4$-alkyl. Furthermore, Y can be N,N-di-$C_1$-$C_4$-alkylamino such as dimethylamino, diethylamino, dipropylamino and dibutylamino or N-pyrrolidinyl, N-piperidinyl, N-morpholinyl or N'-$C_1$-$C$-alkylpiperazinyl if

has the same meaning.

Z is preferably hydrogen.

Z can also be methoxy or ethoxy if $R^1$ and $R^2$ are each $C_1$-$C_4$-alkyl or allyl and Y is a group of the formula

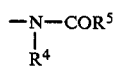

Of the isoindolenine dyes I, those of the general formula Ia

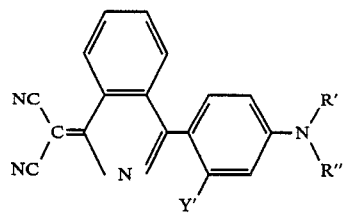

are preferred.

In the formula Ia,

Y' is hydrogen, hydroxyl, methyl

where R is $C_1$-$C_6$-alkyl or phenyl, —NH—$COR^8$ or —NH—$SO_2R^9$, where $R^8$ is linear or branched $C_1$-$C_{12}$-alkyl, methoxymethyl, phenoxymethyl which may be substituted in the phenoxy by methoxy or $C_1$-$C_4$-alkyl, phenylthiomethyl which may be substituted in the phenyl by $C_1$-$C_4$-alkyl, benzyl, phenylethyl, phenyl, $C_1$-$C_{12}$—alkylphenyl, $C_6H_5$—CH=CH—, $C_3$-$C_7$-cycloalkyl, $C_1$-$C_4$-alkoxyphenyl, —$CH_2$-$PO(OCH_3)_2$, —$CH_2$-$PO(OC_2H_5)_2$, —$CH_2$—$PO(OC_3H_7)_2$ or —$CH_2$—$PO(OC_4H_9)_2$, $R^9$ is $C_1$-$C_{12}$-alkyl, phenyl or $C_1$-$C_{12}$-alkylsubstituted phenyl, and R is $C_1$-$C_6$-alkyl or phenyl and R' and R" are each $C_1$-$C_4$-alkyl, 2-hydroxyethyl, $C_1$-$C_4$-alkoxyethyl, 2-phenoxyethyl, 2-chloroethyl, 2-cyanoethyl, 2-(carbomethoxy)ethyl, 2-(carboethoxy)ethyl, 2-(propanoyloxy)ethyl, 2-(ethanoyloxy)ethyl, allyl or benzyl, it being possible for the substituents R' and R" to be identical or different, or R' is hydrogen or methyl and R" is phenyl, methyl-, ethyl-, methoxy- or ethoxysubstituted phenyl or cyclohexyl, or the group

is N-pyrrolidinyl, N-piperidinyl, N-morpholinyl, pyrazolidin-1-yl, $\Delta^2$-3-methylpyrazolin-1-yl, $\Delta^2$-3,5,5-trimethylpyrazolin-1-yl, $\Delta^2$-3-methyl-5-phenylpyrazolin-1-yl, $\Delta^3$-3,5-diphenylpyrazolin-1-yl or N-imidazolyl.

Also suitable are isoindolenine dyes Ia where the group

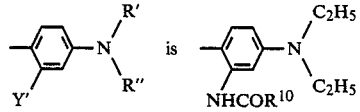

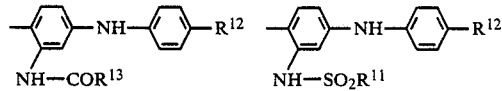

where
- $R^{10}$ is linear or branched $C_1$-$C_{12}$-alkyl, methoxymethyl, phenoxymethyl which may be substituted in the phenoxy by methoxy or $C_1$-$C_4$-alkyl, $C_3$-$C_7$-cycloalkyl, phenyl, $C_1$-$C_4$-alkoxy-or $C_1$-$C_4$-alkyl-substituted phenyl, benzyl, phenlethyl or $C_6H_5$—CH=CH—,
- $R^{11}$ is $C_1$-$C_{12}$-alkyl, phenyl or $C_1$-$C_{12}$-alkylphenyl,
- $R^{12}$ is hydrogen, methyl, ehtyl, methoxy or ethoxy and
- $R^{13}$ is $C_1$-$C_6$-alkyl.

Examples of very particularly advantageous isoindolenine dyes Ia to be used according to the invention are the isoindolenine dyes Ia-1 to Ia-9, of which the isoindolenine dyes Ia3, Ia-4, Ia-5, Ia-7, and Ia-9 are novel as such.

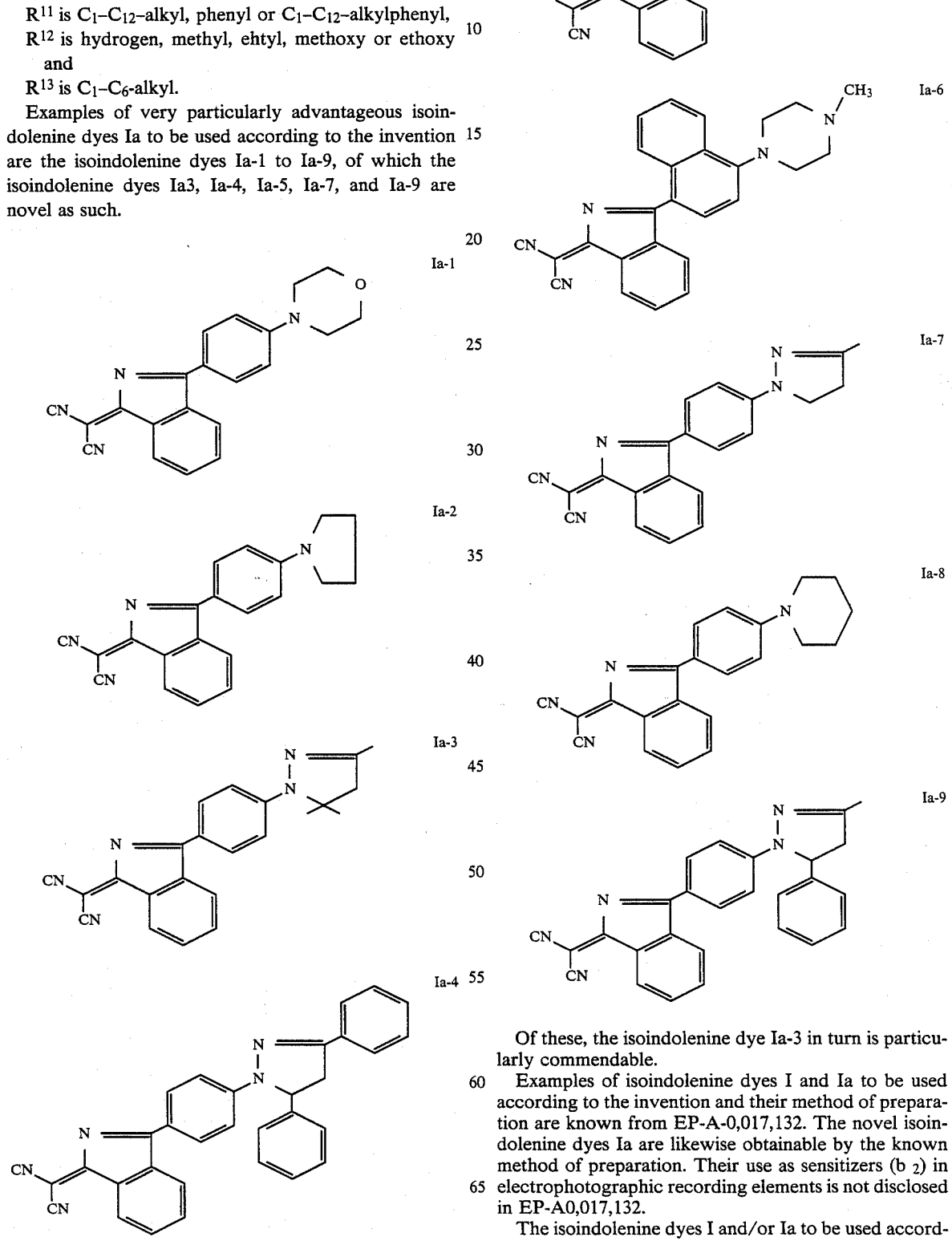

Of these, the isoindolenine dye Ia-3 in turn is particularly commendable.

Examples of isoindolenine dyes I and Ia to be used according to the invention and their method of preparation are known from EP-A-0,017,132. The novel isoindolenine dyes Ia are likewise obtainable by the known method of preparation. Their use as sensitizers (b 2) in electrophotographic recording elements is not disclosed in EP-A0,017,132.

The isoindolenine dyes I and/or Ia to be used according to the invention are present in the novel photoconductive layer (B) as sensitizers (b$_2$) as well as components (b$_1$), (b$_3$) and any (b$_4$) in an amount of from 0.05 to 20, preferably of from 0.1 to 18, advantageously of from 0.5 to 15, in particular of from 1.0 to 10, parts by weight per 100 parts by weight of binder (b$_1$).

If less than 0.5 part by weight of these sensitizers (b$_2$) is added to the novel photoconductive layer (B) per 100 parts by weight of (b$_1$), their light sensitivity leaves something to be desired. If, by contrast, more than 20 parts by weight of (b$_2$) are used per 100 parts by weight of (b$_1$), then in certain circumstances the dark conductivity may increase to undesirably high levels and the mechanical strength of the novel photoconductive layer (B) may decrease markedly, which, despite the otherwise excellent properties of the layer (B), will generally not be acceptable. The range from 0.05 to 10 parts by weight (b$_2$) per 100 parts by weight of (b$_1$) thus represents an optimum range within the limits of which the amount of (b$_2$) is freely choosable and further adaptable to the particular technical problem, the particular intended use and/or the particular material composition of the recording elements according to the invention. In this context, the selected amount of isoindolenine dye I and/or Ia to be used according to the invention depends in particular on the amount of charge carrier transporter compounds or photoconductors (b$_3$) and on whether further customary sensitizers are present in the photoconductive layer (B).

The isoindolenine dyes I and/or Ia to be used according to the invention are also used as a separate sensitizer layer. In this arrangement, the layer comprising one or more isoindolenine dyes I and/or Ia and optionally one or more binders (b$_1$) is present directly on the electrically conducting base (A) and is covered with a layer which contains binders (b$_1$), photoconductors (b$_3$) and any additives (b$_4$). The thickness of the sensitizer or isoindolenine dye layer is from 0.005 to 5, preferably from 0.05 to 3, advantageously from 0.08 to 2, in particular from 0.1 to 0.9, $\mu$m. If this sensitizer layer is thinner than 0.005 $\mu$m, it may in certain circumstances no longer provide complete and uniform coverage of the surface of base (A) and its sensitizer action, ie. its charge carrier generator action, may no longer be sufficient for a given technical problem. If the sensitizer layer is thicker than 5 $\mu$m, it may lead to a barrier effect, ie. the sensitizer layer may impair the drainoff of electric charges on imagewise exposure with actinic light under certain circumstances. As regards sensitization, ie. the generation of a sufficient number of charge carriers, the uniformity of thickness, the adhesion to base (A) and the avoidance of a certain barrier effect, the thickness range from 0.005 to 5 $\mu$m thus represents an optimum. Within this range the thickness of the sensitizer layer is freely choosable and further adaptable to the particular technical problem, the particular intended use and/or the particular material composition of the recording elements according to the invention.

The second essential constituent of the novel photoconductive layers (B) of the electrophotographic recording elements according to the invention is binder (b$_1$).

The nature of binders (b$_1$) suitable for layers (B) depends on the intended use of the recording elements. Suitable for the copying sector are for example cellulose ethers, polyester resins, polyvinyl chlorides, polycarbonates, copolymers, such as styrene/maleic anhydride copolymers or vinyl chloride/maleic anhydride copolymers, or mixtures of such binders (b$_1$). The chief selection criteria are the film-forming and electrical properties, the adhesion to the base material and the solubility characteristics. In particular in the case of recording elements for producing printing plates, in particular those for offset printing, particularly suitable binders (b$_1$) are those which are soluble in alkaline, aqueous or alcoholic solvents. They comprise in particular substances having alkali-solubilizing groups such as anhydride, carboxyl, sulfo, phenol or sulfonimide groups. Preference is given to binders (b$_1$), in particular those having high acid numbers, which are readily soluble in basic aqueous alcoholic developer solvents and have a weight average molecular weight of from 800 to 150,000, in particular 1,200 to 80,000. Suitability is possessed for example by copolymers of methacrylic acid and methacrylic esters, in particular copolymers of styrene and maleic anhydride and of styrene, methacrylic acid and methacrylic esters, as long as they meet the aforementioned solubility condition. Although, as is known, binders (b$_1$) having free carboxyl groups undesirably increase the dark conductivity of electrophotographic layers and thereby can lead to poor tonering results, such binders (b$_1$) are easily adaptable to the charge transport compounds or photoconductors (b$_3$) used. It has been found, for instance, that copolymers of styrene, maleic anhydride and acrylic or methacrylic acid which contain from 5 to 50 % by weight of copolymerized maleic anhydride and from 5 to 35, in particular from 10 to 30, % by weight of copolymerized acrylic or methacrylic acid give photoconductive layers (B) of low dark conductivity. They show excellent solubility in developer solvents comprising for example 75 % by weight of water, 23 % by weight of isobutanol and 2 % by weight of sodium carbonate.

The third essential constituent of the novel photoconductive layers (B) of the electrophotographic recording elements according to the invention is the charge carrier transporter compound or photoconductor (b$_3$). It comprises the conventional low molecular weight oxazole derivatives (DE-B-1,120,875), oxadiazole derivatives (DE-B-1,058,836), triazole derivatives (DE-B1,060,260), azomethines (US-A-3,041,165), pyrazoline derivatives (DE-B-1,060,714), imidazole derivatives (DE-B1,106,599), arylamines (DE-B-2,712,557), 1,3-dithiol derivatives (DE-B-3,338,204), benzotriazole derivatives (EP-A-0,131,292), triazolylpyridine derivatives (EP-A0,150,419), pyrazolotriazole derivatives (EP-A-0,156,308), triphenyltriazole derivatives (EP-A-0,162,216) or hydrazone derivatives (EP-A-0,001,599, DE-A-2,919,791 corresponds to US-A-4,367,273 and US-A-4,278,747; GB-A-2,088,074 or DE-A-3,140,571) or the likewise conventional oligomeric or polymeric photoconductors poly(N-vinylcarbazole) or arylamine polymers (EP-A-0,052,961).

The novel photoconductive layers (B) contain one or more of these photoconductors (b$_3$) in an amount of from 40 to 150, preferably from 40 to 130, advantageously from 50 to 120, in particular from 60 to 100, parts by weight per 100 parts by weight of binder (b$_1$).

The novel photoconductive layer (B) may in addition contain, based on its total amount, up to 30 % by weight, preferably 25 % by weight, advantageously 20 % by weight, in particular 15 % by weight, of additives (b$_4$). Suitable additives (b$_4$) are essentially only those which do not impair the optical transparency of the novel photoconductive layer (B), although the additives may have a wide range of functions. For instance, flow control agents such as silicone oils, wetting agents, in particular nonionic substances, plasticizers based on chlorinated hydrocarbons or on phthalic esters, adhesion promoters, non-molecularly dispersible organic and inorganic fillers and reinforcing fillers, the metal acetyl-acetonates known from EP-A0,131,215 and/or the conventional sensitizers of the classes of the triarylmethane, xanthene or cyanine dyes may be additionally added to the layer (B). Moreover, the novel photoconductive layer (B), if constructed as a photoconductive double layer, may contain in the separate sensitizer layer charge carrier generator pigments from the classes of the azo, phthalocyanine, naphtholactam and/or perylene dyes. These pigments, however, may also be present as an additional separate sensitizer layer. Furthermore, these pigments may be present as a single separate sensitizer layer of the novel double layer (B), although the separate layer composed of ($b_1$), ($b_3$) and any ($b_4$) must obligatorily contain the isoindolenine dyes I to be employed according to the invention.

Accordingly, the novel photoconductive layers (B), based on their total amount, consist of
- from 70 to 100, preferably from 75 to 100, advantageously from 80 to 100, in particular from 85 to 100, % by weight of a sensitized photoconductive mixture of components ($b_1$), ($b_2$) and ($b_3$) and of
- from 0 to 30, preferably from 0 to 25, advantageously from 0 to 20, in particular from 0 to 15, % by weight of additives ($b_4$).

Here the sensitized photoconductive mixture consists of
- 100 parts by weight of a binder ($b_1$) and
- from 0.05 to 20, preferably from 0.1 to 18, advantageously from 0.5 to 15, in particular from 1.0 to 10, parts by weight of isoindolenine dyes I and/or Ia to be used according to the invention (=sensitizer $b_2$) and
- from 40 to 150, preferably from 40 to 130, advantageously from 50 to 120, in particular from 60 to 100, parts by weight of photoconductors ($b_3$).

If the novel photoconductive layer (B) is not constructed as a double layer, its thickness is from 0.5 to 40, preferably from 0.8 to 25, advantageously from 1 to 20, in particular from 1.5 to 15, $\mu$m.

If the novel photoconductive layer (B) has been constructed as a double layer, the thickness of the sensitizer layer containing the isoindolenine dyes I and/or Ia or the thickness of the sensitizer layer consisting of isoindolenine dyes I and/or Ia is, as stated above, from 0.005 to 5, preferably from 0.05 to 3, advantageously from 0.08 to 2, in particular from 0.1 to 0.9, $\mu$m, and the total thickness of the double layer is from 2 to 30, preferably from 3 to 25, advantageously from 3.5 to 20, in particular from 5 to 15, $\mu$m.

Aside from the novel photoconductive layer (B), the electrically conducting base (A) is the further essential constituent of the electrophotographic recording elements according to the invention. It is basically possible to use for this purpose any electrically conducting base material as long as it can be processed into dimensionally stable thin plates or sheets. Depending on the intended use of the recording elements according to the invention, aluminum, zinc, magnesium, copper, steel or multimetal plates or plates as they are conventionally used for the production of circuit boards, polymer films having a metallized surface, such as aluminum vapor deposition coated polyethylene terephthalate films or electrically conducting special papers are used. Here preference is given in particular to the raw or pretreated aluminum sheets or foils which are typical for offset printing plates. The pretreatment of the aluminum sheets or foils comprises a chemical, mechanical or electrochemical roughening of the surface and/or an anodic oxidation to form a porous aluminum oxide layer, with or without a subsequent sealing of the aluminium oxide layer in question. In general, bases (A) vary in thickness, with the intended use of the recording materials, from 50 $\mu$m to 1.5 mm, in particular from 80 $\mu$m to 0.6 mm.

In addition, the electrophotographic recording elements according to the invention may contain at least one further layer which is useful to the functioning of the recording elements. This further layer or layers can comprise the above-described known additional sensitizer layers which are arranged between the base (A) and the novel photoconductive layer (B). Furthermore, it is possible to use the layers of for example particulate titanium dioxide, zinc oxide, $\gamma$-iron(III) oxide, barium titanate, aluminum oxide or cerium oxide known from DE-B-2,504,545. It is also possible to use layers of inorganic photoconductors such as selenium or cadmium sulfide as additional constituents of the recording materials. Furthermore, it is possible to use the top layers of silicon monoxide, magnesium fluoride or calcium fluoride known from EP-A-0,046,960.

The preparation of the electrophotographic recording elements according to the invention has no special methodical features; on the contrary, the preparation of the novel photoconductive layer (B) is effected by conventional methods of preparing thin organic layers, and the preparation of the electrically conducting base (A) is effected by the conventional methods of preparing thin metal sheets or foils and metal vapor deposition coated polymer films.

In an advantageous procedure of preparing the novel photoconductive layers (B), the components of the novel photoconductive layers (B) are dissolved in suitable solvents, and the resulting solutions are cast onto the bases (A) in such a way that, following drying of the wet layers, the layers (B) are obtained in the desired uniform thickness. If the novel photoconductive layers (B) are to be constructed as double layers, then the isoindolenine dyes I-and or Ia-containing sensitizer layers or the sensitizer layers consisting of isoindolenine dyes I and/or Ia are first produced in the desired thickness by casting from solution and drying the wet layers on the surface of base (A). Thereafter these sensitizer layers are covered with layers of components ($b_1$), ($b_3$) and any ($b_4$) by casting from solution and drying the wet layers, care being taken to ensure that the solvents used here do not damage the sensitizer layers present. The preparation of the casting solutions in question is effected by means of conventional mixing and dissolving techniques.

If the electrophotographic recording elements according to the invention are to contain further layers these further layers are produced by means of methods which are conventional and characteristic for preparing the particular layers. It is of course the case that the order in which the individual process steps are carried out depends on, or rather is predetermined by, the desired structure for the recording elements.

The electrophotographic recording element according to the invention has numerous outstanding properties which hitherto were not simultaneously realizable in kind and number by means of existing recording elements. This hitherto unobtainable combination of outstanding properties has a particular unexpected technical effect which manifests itself advantageously not only with the recording elements according to the invention themselves but specifically also with the consecutive products produced therefrom, namely the drums in photocopiers, offset printing plates and electrophotographic photoresists, and last but not least with the photocopies, printed copies and circuit boards produced therewith.

For instance, the recording element according to the invention combines a very low dark conductivity with a high electric chargeability, a particularly high sensitivity to actinic light and excellent electrokinetic properties. This rage of properties brings about an excellent, extremely detailed, high-contrast reproduction of image originals in a shorter time than hitherto possible, which is a particularly significant advantage in particular for the practical operations of a reprographics business. Moreover, the recording element according to the invention which has been subjected to imagewise exposure is completely free of any scumming tendency in the non-image areas, thereby appreciably improving, if not making possible in the first place, the high-contrast reproduction of critical fine image elements in image originals, such as the reproduction of fine halftone dots in light tonal areas. Despite its high sensitivity to actinic light, the recording element according to the invention is simple to handle, so that its handling does not require any special precautions. Owing to this high sensitivity to actinic light and the particularly rapid photodrop induced thereby and because the law $$I \times t = \text{constant}$$

(I=light intensity; t=time)
is also valid in the nanosecond range, the recording element according to the invention makes it possible to utilize the advantages of modern exposure methods in full. It is therefore suitable not only for the customary imagewise exposure by means of incandescent lamps and fluorescent tubes but also for the image-wise exposure by means of pulse code modulated or analog modulated laser beams guided across the recording element. It is thus possible to effect imagewise exposure with modern computer-controlled laser light exposure instruments to obtain on account of the advantageous properties of the recording element these quite outstanding imaging results.

The recording element according to the invention has distinct advantages for use in the photocopying sector. For instance, it is easy to apply to the drums customarily present in photocopiers and in this form makes it possible to produce excellent photocopies even of yellowed originals in long runs and a very short cycle time. In addition, these drums are simple to dispose of in an environmentally safe manner after their advantageously long life. The photocopies produced therewith are particularly high in contrast, true to detail even in problematic image elements and untonered in the nonimage areas.

The recording element according to the invention also has distinct advantages for use as a photoresist. For this purpose it is applied to bases (A) customarily used for producing circuit boards. Thereafter, it is subjected to imagewise exposure with actinic light, again fully benefiting from the aforementioned advantages of modern exposure methods. Thereafter a toner image is produced in a conventional manner on the exposed recording element and fixed by heating, and the untonered nonimage areas are then removed with suitable developer solvents. This gives an excellent photoresist image which is faithful down to the last detail, which is free of pitting, underpenetration of relief sidewalls and edge fragmentation, which adheres firmly to the base (A) and which is very highly resistant to the etching reagents and electro-plating baths customarily used. This process produces, substantially without rejects, error-free circuit boards which have an advantageously long life.

The recording element according to the invention has particularly distinct advantages for use in the production of offset printing plates produced in a conventional manner by 1. electrostatic charging of the recording element according to the invention by means of a high-voltage corona, 2. immediately thereafter subjecting the recording element to imagewise exposure with actinic light to produce a latent electrostatic charge image, 3. developing the latent electrostatic charge image by means of a dry or liquid toner, followed by 4. fixing the toner image by heating and 5. washing away the untonered nonimage areas of the novel photoconductive layer (B) of the recording element according to the invention by means of a suitable developer liquid to bare the hydrophilic surface of the base (A).

In this use, the recording element according to the invention can be subjected to a particularly high voltage and to imagewise exposure within a short exposure time thereby fully utilizing the advantages of modern exposure methods. The rapid and reliable results are highcontrast latent charge images which are completely faithful down to the last detail and which give toner images which are completely untonered in the nonimage areas. This reprographic accuracy also makes it possible to use toners which would otherwise not be considered suitable, so that the entire production process can be made more varied and better adapted to specific technical problems. After the toner image has been fixed, the nonimage areas are removable without problems and without subsequently damaging the toner image. A large number of different developer solvents can be used for this purpose. The choice of developer solvent depends, as mentioned above, first and foremost on the material composition of the original photoconductive layer (B), the crucial parameter being the solubility or swellability of the binder ($b_1$) present therein. Owing to the now possible improved mutual adaptation of the toner materials and the materials of the original photoconductive layer (B), it is possible to use developer solvents which are appreciably more powerful and/or washout methods employing higher solvent or brush pressure. The result is a shorter development time, but no image area damage is incurred.

The offset printing plate obtained in this manner gives excellent reproduction even of those image elements which are otherwise only very difficult to reproduce reliably. It can be further prepared in a known manner for offset printing, for example by means of hydrophiling or gumming, to further increase its already excellent quality.

On printing on an offset press with offset printing inks of the oil in water type, the image areas of the offset printing plate are highly receptive toward the oily inks, while the cleared areas of the plate are highly water-receptive. The result is an excellent contrast and extremely precise printing, which as a whole leads to excellent printed copies. Since the offset printing plate has an advantageously long life under printing conditions, moreover, a long run is obtained.

EXAMPLES AND COMPARISONS

In the Examples and Comparisons below, the application properties were determined using the xerographic process (Carlson process). To this end, not only novel (Examples 1 to 8) but also prior art (Comparisons C1 to C8) electrophotographic recording elements were prepared, charged uniformly in a conventional manner by means of a direct voltage corona of $+8.5$ kV or $-8.5$ kV at a distance of 1 cm to a surface potential of up to $+1,000$ V or $-1,000$ V in the course of 20 seconds and thereafter subjected to imagewise or uniform exposure in the course of one second. The individual process steps here were of course each carried out under exactly comparable conditions, so that the voltage drop measured inductively in a conventional manner on induction by the uniform exposure (=photodrop PD in %, original value = 100 %) clearly indicated the advantageousness of the recording materials according to the invention.

EXAMPLE 1 AND COMPARISON C1

In each case, 0.544 g of a copolymer containing 52 % by weight of styrene, 28 % by weight of methacrylic acid and 20 % by weight of maleic anhydride in copolymerized form (binder b1) was dissolved in 9 g of tetrahydrofuran in the course of 30 minutes. 0.5 g of 2,5-bis(4'-diethylaminophen-1'-yl)-1,3,4-oxadiazole (photoconductor b3) was added to each of the resulting copolymer solutions and stirred in for a further 15 minutes.

In parallel therewith, solutions were prepared from 0.006 g each of the isoindolenine dye Ia-3 to be used according to the invention (sensitizer b2, Example 1) or 0.006 g of Rhodamine B (Comparison C1) and 1 g each of ethylene glycol monoethyl ether.

Thereafter, each sensitizer solution was combined with a binder/photoconductor solution. The combined solutions were cast onto 0.30 mm thick electrochemically roughened and anodically oxidized aluminum sheets (bases A) and dried, so that the 5 $\mu$m thick novel photoconductive layers (B) (Example 1) and prior art photoconductive layers (Comparison C1) were obtained. These layers were negatively charged and then exposed with a xenon high pressure lamp where between the light source and the recording material a high pass filter OG 590 from Spindler and Hoyer was situated, which only let through light of the wavelength region above $\lambda = 590$ nm. The resulting photodrop was measured inductively in a conventional manner. Here the recording material according to the invention showed a photodrop of 91% (Example 1), while the known recording material had a photodrop of 89% (Comparison C1). Accordingly, the sensitizing action of the isoindolenine dye Ia-3 to be used according to the invention was superior in the red and infrared regions of the spectrum to that of Rhodamine B.

EXAMPLE 2 AND COMPARISON C2

Example 1 and Comparison C1 were repeated, except that both the recording element according to the invention and the prior art recording element were, after charging, subjected to imagewise exposure in a commercial laser recorder from Hope by means of a helium-neon laser (wave-length $\lambda$ of main emission = 633 nm). Here the writing speed was 193 m/s for an image dot frequency of 3.8 MHz, corresponding to 42 $cm^2 \cdot s^{-1}$ of exposed surface area for a plate advance in 27 $\mu$m steps.

After the imagewise exposure the recording element according to the invention and the prior art recording element were tonered using as the toner a carbon black dispersed in a thermoplastic. After tonering, the two resulting toner images were fixed by heating to 100° C.

The prior art recording element already showed disadvantages at this stage, in that its nonimage areas had been slightly but nevertheless noticeably tonered, while the recording element according to the invention was completely toner-free in the nonimage areas.

Thereafter the two recording elements were developed by wiping with a developer liquid comprising 0.5 % by weight of sodium carbonate, 0.3 % by weight of sodium silicate, 25 % by weight of isopropanol and 74.2 % by weight of water, baring the surface of bases (A) in the nonimage areas. In this way, the differentiation into hydrophilic and oleophilic areas typical of offset printing plates was obtained not only with the recording element according to the invention but also with the prior art recording element, the bared surface of bases (A) forming the hydrophilic areas.

Thereafter the two offset printing plates were rinsed with water, and the hydrophilic character of the bared surface of the base was further increased by wiping with dilute phosphoric acid.

After inking with an offset printing ink of the oil in water type, the two offset printing plates were employed for printing in an offset press.

In printing, the offset printing plate produced from the recording element according to the invention (Example 2) produced a long run of excellent printed copies which were completely faithful to the original and which were up to the highest quality standards, while the prior art offset printing plate could only produce printed copies of moderate quality.

This shows that the advantages of modern exposure methods can be utilized in full by means of the electrophotographic recording element according to the invention.

EXAMPLE 3 AND COMPARISON C3

Two solutions were prepared, each comprising 1 g of poly(N-vinylcarbazole) in 8 g of tetrahydrofuran.

A solution of 0.02 g of isoindolenine dye Ia-3 in 1 g of ethylene glycol monoethyl ether was added to one of these solutions (Example 3), while the corresponding Rhodamine B solution was added to the other solution (Comparison C3).

The two resulting solutions were used in a conventional manner to prepare a recording element according to the invention and a prior art recording element by casting from solution, again on the aluminum sheets mentioned in Example 1. The two recording elements were charged not only positively but also negatively and exposed with a xenon high pressure lamp and afterwards the resulting photodrop was measured.

For the positively charged recording element according to the invention, this photodrop was 81.2 % and in the case of the negatively charged recording element according to the invention 73.6 % (Example 3). The corresponding values for the prior art recording element were 60.1 % and 51.4 % (Comparison C3), again documentinghe superiority of the recording element according to the invention

EXAMPLES 4 TO 8 AND COMPARISONS C4 TO C8

General experimental method

A solution comprising 0.6 g of polycarbonate (®Makrollon 2800 from Bayer AG), 0.4 g of a photoconductor (b3) and 8 g of tetrahydrofuran was combined with a solution comprising 0.02g of a sensitizer and 1 g of ethylene glycol monoethyl ether. The resulting solution was processed in a conventional manner into a recording element by casting from solution, again using the aforementioned aluminum sheets.

The resulting recording element was tested as described in Example 3.

Table 1 gives an overview of the sensitizers and photoconductors used and summarizes the results obtained with the recording elements produced The experiments again document the excellent sensitizing action of isoindolenine dyes I and/or Ia to be used according to the invention. EXAMPLE 9

Preparation of the isoindolenine dye Ia-3 according to the invention; experimental method:

were refluxed together with 2 drops of concentrated sulfuric acid in 20 ml of toluene for 2 hours with stirring. Thereafter the resulting reaction mixture was cooled down, and crude Ia-3 precipitated as a solid. The crude product was separated off and washed first with methanol and then with hot water. This gave the pure isoindolenine dye Ia-3

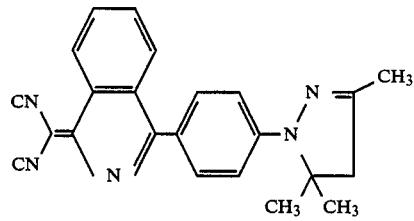

Ia-3 in a yield of 40% based on the isoindolenine derivative. The elemental composition of Ia-3 corresponded to that calculated in theory. The absorption spectrum of Ia-3 in the spectral region of from $\lambda=270$ to $=750$ nm had three maxima at 297, 316 and 610.5 nm.

TABLE 1

Examples 4 to 8 and Comparisons C4 to C8
The sensitizing action of the isoindolenine dye Ia-3 to be used according to the invention in the presence of different photoconductors (b3) and in comparison with Rhodamine B

| Example and Comparison | Photoconductor (b3) | Sensitizer (b2) | Photoinduced voltage drop (%) after positive charging | after negative charging |
|---|---|---|---|---|
| 4 | 2,5-bis(4'-diethylaminophen-1-yl)-1,3,4-oxadiazole | Ia-3 | 87.4 | 92.4 |
| C4 | " | Rhodamine B | 33.4 | 39.4 |
| 5 | 2-vinyl-4-(4'-N,N—diethylamino-5-(2-chlorophenyl)-1,3-oxazole | Ia-3 | 65.0 | 80.6 |
| C5 | " | Rhodamine B | 19.3 | 21.1 |
| 6 | 2-(4'-N—ethyl-N—phenylamino-phen-1'-yl)-5-methoxy-benzotriazole | Ia-3 | 61.6 | 74.9 |
| C6 | " | Rhodamine B | 10.8 | 15.2 |
| 7 | 1-phenyl-3-(4'-N,N—diethylamino-β-styryl)-5-(4'-N,N—diethylamino-phen-1'-yl)- Δ²-pyrazoline | Ia-3 | 95.2 | 92.4 |
| C7 | " | Rhodamine B | 22.7 | 50.3 |
| 8 | 4-N,N—diethylamino-benzaldehyde-diphenylhydrazone | Ia-3 | 95.6 | 91.3 |
| C8 | " | Rhodamine B | 28.2 | 60.2 |

5 g of the isoindolenine derivative

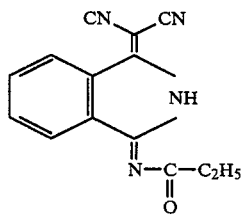

and 4.13 g of the pyrazoline derivative

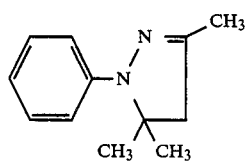

We claim:
1. An electrophotographic recording element comprising
   (A) an electrically conducting base and
   (B) at least one layer consisting essentially of
      (b1) at least one binder,
      (b2) at least one sensitizer which on exposure of layer
         (B) generates charge carriers and which is selected from the group of the isoindolenine dyes of the general structure I

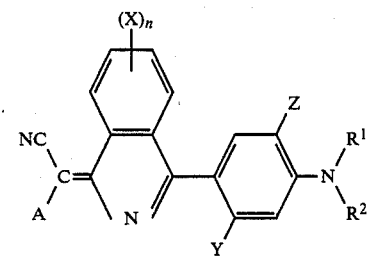

where the index and the variables are defined as follows:
A is cyano, carbo-$C_1$-$C_4$-alkoxy, carbamoyl, N-$C_1$-$C_4$-alkylcarbamoyl, N-$C_1$-$C_4$-alkylcarbamoyl where the alkyl is substituted by $C_1$-$C_4$-alkoxy, N-phenylcarbamoyl, N-phenylcarbamoyl where the phenyl is substituted by $C_1$-$C_4$-alkyl or $C_1$-$C_4$-alkoxy, or is acetyl, benzoyl, 4-nitrophenyl or 4-cyanophenyl, X is hydrogen, chlorine, $C_1$-$C_4$-alkyl or $C_1$-$C_4$-alkoxy, it being possible when n = 2 for the substituents to be identical or different, n is 1 or 2, $R^1$ is hydrogen, methyl, ethyl or 2-hydroxyethyl and $R^2$ is phenyl, $C_1$-$C_4$-alkyl-or $C_1$-$C_4$-alkoxysubstituted phenyl or cyclohexyl, or $R^1$ is hydrogen and $R^2$ is $C_1$-$C_4$-alkyl, or $R^1$ and $R^2$ are each $C_1$-$C_6$-alkyl, $C_1$-$C_4$-alkyl which is substituted by chlorine, cyano, hydroxyl, $C_1$-$C_4$-alkoxy, phenoxy, $C_2$-$C_5$-alkanoyloxy, $C_2$-$C_5$alkanoyloxy which is substituted by $C_1$-$C_4$-alkoxy or phenoxy, or carbo-$C_1$-$C_4$-alkoxy, or are each allyl or phenyl-$C_1$-$C_4$-alkyl, or the group

is a saturated or unsaturated heterocyclic five-membered ring, a saturated or unsaturated heterocyclic six-membered ring, a saturated or unsaturated heterocyclic five- or six-membered ring which each additionally contains an oxygen atom or a further nitrogen atom, Y is hydrogen, hydroxyl, methyl or ethyl,
Y is

where $R^3$ is linear or branched $C_1$-$C_{12}$-alkyl, phenyl or $C_1$-$C_4$-alkyl-or $C_1$-$C_4$-alkoxy-substituted phenyl,

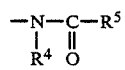

where $R^4$ is hydrogen or $C_1$-$C_4$-alkyl and $R^5$ has the following meanings: hydrogen, linear or branched $C_1$-$C_{12}$-alkyl, trifluoromethyl, chloromethyl, $C_1$-$C_4$-alkoxymethyl, phenoxymethyl, phenoxymethyl with one of the following substituents in the phenoxy group: chlorine, methoxy, nitro or $C_1$-$C_4$-alkyl, phenoxymethyl with two substituents selected from the group consisting of chlorine, methoxy, nitro and $C_1$-$C_4$-alkyl in the phenoxy group, phenylthiomethyl, phenylthiomethyl where the phenyl is substituted by $C_1$-$C_4$-alkyl, benzyl, phenylethyl, $C_3$-$C_7$-cycloalkyl, phenyl, $C_1$-$C_{12}$-alkyl-, $C_1$-$C_{12}$-alkoxy-or nitro-substituted phenyl, $H_5C_6$—CH=CH—, or —$CH_2$—$PO(OR^6)_2$, where $R^6$ is $C_1$-$C_4$-alkyl, or Y is

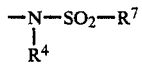

where $R^4$ is as defined above and $R^7$ is $C_1$-$C_{12}$-alkyl, phenyl or $C_1$-$C_{12}$-alkylphenyl, or Y is N-$C_1$-$C_4$-alkylamino when $R^1$ and $R^2$ are each $C_1$-$C_4$-alkyl, or Y is N,N-di-$C_1$-$C_4$-alkylamino, N-pyrrolidinyl, N-piperidinyl or N-morpholinyl, when

has the same meaning, and

Z is hydrogen or if $R^1$ and $R^2$ are each $C_1$-$C_4$alkyl or allyl and Y is

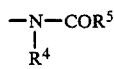

also methoxy or ethoxy, and (b₃) at least one photoconductor which transports the generated charge carriers.

2. The electrophotographic recording element as claimed in claim 1, where the sensitizers (b₂) are selected from the isoindolenine dyes of the general structure Ia

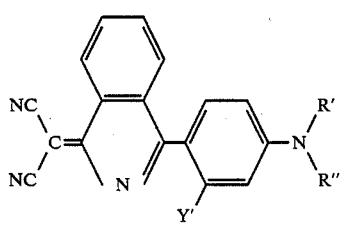

(Ia)

where the variables are defined as follows:
Y' is hydrogen, hydroxyl, methyl
Y' is

—NHCOR⁸ or —NHSO₂—R⁹,
where
R is $C_1$-$C_6$-alkyl or phenyl,
$R^8$ is linear or branched $C_1$-$C_{12}$-alkyl, methoxymethyl, phenoxymethyl, phenoxymethyl substituted in the phenoxy by methoxy or $C_1$-$C_4$-alkyl, phenylthiomethyl, phenylthiomethyl substituted in the phenyl by $C_1$-$C_4$-alkyl, benzyl, phenylethyl, phenyl, $C_1$-$C_{12}$—alkylphenyl, $C_6H_5$—CH=CH-$C_3$-$C_7$-cycloalkyl, $C_1$-$C_4$-alkoxyphenyl, —$CH_2$-PO(OCH$_3$)$_2$, —$CH_2$—PO(OC$_2$H$_5$)$_2$, —$CH_2$-PO(OC$_3$H$_7$)$_2$ or —$CH_2$——$CH_2$—PO(OC$_4$H$_9$)$_2$, and $R^9$ is $C_1$-$C_{12}$-alkyl, phenyl or $C_1$-$C_{12}$-alkylphenyl, R' and R" are each $C_1$-$C_4$-alkyl, 2-hydroxyethyl, $C_1$-$C_4$-alkoxyethyl, 2-phenoxyethyl, 2-chloroethyl, 2cyanoethyl, 2-(carbomethoxy) ethyl, 2-(carboethoxy)ethyl, 2-(propanoyloxy)ethyl, 2-(ethanoyloxy)ethyl, allyl or benzyl, the substituents R' and R" being identical or different, or R' is hydrogen or methyl and R" is phenyl, methyl-, ethyl-, methoxy- or ethoxy-substituted phenyl or cyclohexyl, or the group $$-N\begin{matrix}R'\\ \\R''\end{matrix}$$

is N-pyrrolidinyl, N-piperidinyl, pyrazolidin-1-yl, $\Delta^2$-3-methylpyrazolin-1-yl, $\Delta^2$-3,5,5-trimethylpyrazolin-1-yl, $\Delta^2$-3-methyl-5-phenylpyrazolin-1-yl, $\Delta^3$-3,5-diphenylpyrazolin-1-yl, N-imidazolyl or N-morpholinyl.

3. The electrophotographic recording element as claimed in claim 2, where the sensitizers (b2) are selected from the group consisting of isoindolenine dyes Ia of the general structure Ia where the radical

is a radical of the formula

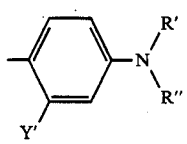

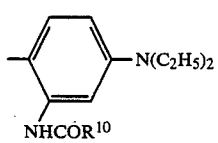

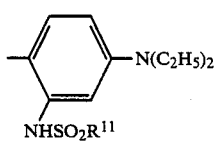

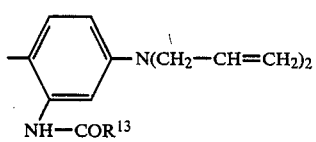

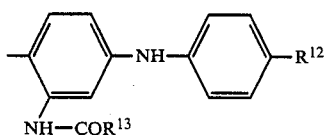

-continued or

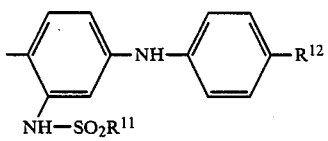

where the variables are defined as follows:

$R^{10}$ is linear or branched $C_1$-$C_{12}$-alkyl, methoxymethyl, phenoxymethyl which is substituted in the phenoxy by methoxy or $C_1$-$C_4$-alkyl, $C_3$-$C_7$-cycloalkyl, phenyl, $C_1$-$C_4$-alkoxy-or $C_1$-$C_4$-alkylsubstituted phenyl, benzyl, phenylethyl or $C_6H_5$—CH=CH13, $R^{11}$ is $C_1$-$C_{12}$-alkyl, phenyl or $C_1$-$C_{12}$-alkylphenyl, $R^{12}$ is hydrogen, methyl, ethyl, methoxy or ethoxy and $R^{13}$ is $C_1$-$C_6$-alkyl.

4. The electrophotographic recording element as claimed in claim 2, where the sensitizers (b2) are selected from the group of isoindolenine dyes of the general structure Ia where R' and R" are each ethyl and Y' is —NHCOR$^{14}$ or —NH—SO$_2$R$^{15}$ where R$^{14}$ is $C_1$-$C_{12}$-alkyl or phenoxymethyl and R$^{15}$ is methyl or ethyl.

5. The electrophotographic recording element as claimed in claim 4, where the sensitizers (b2) are selected from the group of isoindolenine dyes of the general structure Ia where R' and R" are each ethyl and Y' is —NH—COR$^{14}$ where R14 is methyl or ethyl.

6. The electrophotographic recording element as claimed in claim 2 where the sensitizers (b2) are selected from the group of isoindolenine dyes of the general structure Ia where R' and R" are each ethyl and Y' is

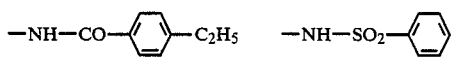

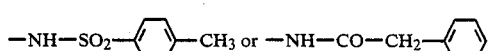

7. The electrophotographic recording element as claimed in claim 2, where the sensitizers (b2) are selected from the group of isoindolenine dyes of the general structure Ia where Y' is hydrogen and

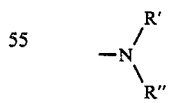

is $\Delta^3$-3-methylpyrazolin-1-yl, $\Delta^2$-3,5,5-trimethylpyrazolin-1-yl, $\Delta^2$-3-methyl-5-phenylpyrazolin-1-yl or $\Delta^3$-3,5-diphenylpyrazolin-1-yl.

8. The electrophotographic recording element as claimed in claim 1, wherein layer (B) is a double layer consisting of an isoindolenine dye I-containing sensitizer layer (b2) and a layer containing a binder (b1) and photoconductor (b3).

9. The electrophotographic recording element as claimed in claim 2, wherein the layer (B) is a double layer which consists of an isoindolenine dye Ia-containing sensitizer layer (b$_2$) and a layer containing a binder (b$_1$) and a photoconductor (b$_3$).

10. The electrophotographic recording element as claimed in claim 8, where the sensitizer layer (b$_2$) consists of isoindolenine dyes I.

11. The electrophotographic recording element as claimed in claim 9, where the sensitizer layer (b$_2$) consists of isoindolenine dyes Ia.

12. The electrophotographic recording element as claimed in claim 8, where the sensitizer layer (b$_2$) consists of isoindolenine dyes I and Ia.

13. The electrophotographic recording element as claimed in claim 1, wherein a further sensitizer layer of a pigment known per se is situated between the base (A) and the photoconductive layer (B).

14. The electrophotographic recording element as claimed in claim 2, wherein a further sensitizer layer of a pigment known per se is situated between the base (A) and the photoconductive layer (B).

15. The electrophotographic recording element as claimed in claim 1, wherein a further photoconductive layer of a photoconductor (b$_3$) known per se is situated on the base (A).

16. The electrophotographic recording element as claimed in claim 2, wherein a further photoconductive layer of a photoconductor (b$_3$) known per se is situated on the base (A).

17. The electrophotographic recording element as claimed in claim 1 for producing electrophotographic printing plates comprising a base (A) from 80 μm to 0.6 mm in thickness suitable for printing plates and at least one photoconductive layer (B).

18. The electrophotographic recording element as claimed in claim 2 for producing offset printing plates comprising a base (A) from 80 μm to 0.6 mm in thickness suitable for printing plates and at least one photoconductive layer (B).

19. The electrophotographic recording element as claimed in claim 17, wherein the binder (b$_1$) is soluble in aqueous alkaline or aqueous alcoholic developer solvents.

20. The electrophotographic recording element as claimed in claim 18, wherein the binder (b$_1$) is soluble in aqueous alkaline or aqueous alcoholic developer agents.

21. The electrophotographic recording element as claimed in claim 19, wherein the binder (b$_1$) is a copolymer of styrene, maleic anhydride and acrylic acid and/or methacrylic acid, which contains in copolymerized form and based on its total amount from 5 to 50% by weight of maleic anhydride and from 5 to 35% by weight of acrylic acid and/or methacrylic acid.

22. The electrophotographic recording element as claimed in claim 20, wherein the binder (b$_1$) is a copolymer of styrene, maleic anhydride and acrylic acid and/or methacrylic acid, which contains in copolymerized form and based on its total amount from 5 to 50% by weight of maleic anhydride and from 5 to 35% by weight of acrylic acid and/or methacrylic acid.

* * * * *

UNITED STATES PATENT AND TRADEMARK OFFICE
CERTIFICATE OF CORRECTION

PATENT NO. : 4,880,718

DATED : Nov. 14, 1989

INVENTOR(S) : LEYRER et al.

It is certified that error appears in the above-identified patent and that said Letters Patent is hereby corrected as shown below:

IN THE ABSTRACT

That part of the abstract reading "($b_3$) at least one index and the variables have specifies the generated charge carriers" should read --($b_3$) at least one photoconductor which transports the generated charge carriers--.

IN THE CLAIMS

Claim 1, col. 21,
    line 22, "$C_1$-$C4$-alkyl" should read --$C_1$-$C_4$-alkyl--;
    line 27, "$C_1$-$C_4$-alkoxysub-" should read --$C_1$-$C_4$-alkoxy-sub- --;
    line 35, "carbo-$C_1$-C4-alkoxy" should read --carbo-$C_1$-$C_4$-alkoxy--;
    line 60, "$-N-C-R^5$" should read --Y is $-N-C-R^5$--;
              $\underset{R^4}{|}\underset{O}{\|}$                    $\underset{R^4}{|}\underset{O}{\|}$ line 63, "$C_1$-C4-alkyl" should read --$C_1$-$C_4$-alkyl--.
Claim 1, col. 22,
    line 6, "$C_3$-C7-cycloalkyl" should read --$C_3$-$C_7$-cycloalkyl--;
    line 19, "N-Cl-$C_4$-alkylamino" should read --N-$C_1$-$C_4$-alkylamino--.
Claim 2, col. 22,
    line 66, "$C_1$-Cl2-alkyl" should read --$C_1$-$C_{12}$-alkyl--.
Claim 2, col. 23,
    line 4, "$C_6H_5$-CH=CH-$C_3$-$C_7$-cycloalkyl should read --$C_6H_5$-CH=CH-, $C_3$-$C_7$-cycloalkyl--;
    line 6, "$_2$-PO($OC_2H_5$)2" should read --$_2$-PO($OC_2H_5$)$_2$--;
    line 7, "$_2$--$CH_2$-PO($OC_4H_9$)$_2$" should read -- $_2$-$CH_2$-PO($OC_4H_9$)$_2$--;
    line 8, "$C_1$-Cl2-alkyl, phenyl or $C_1$-Cl2-alkylphe-" should read
        --$C_1$-$C_{12}$-alkyl, phenyl or $C_1$-$C_{12}$-alkylphe- --;
    line 10, "$C_1$-C4-alkyl" should read --$C_1$-$C_4$-alkyl--;
    line 12, "2cyanoethyl" should read --2-cyanoethyl--.
Claim 3, col. 23,
    line 31, "(b2)" should read --($b_2$)--;
Claim 3, col 24,
    line 12, "$C_1$-Cl2-alkyl" should read --$C_1$-$C_{12}$-alkyl--;
    line 15, "7-cycloalkyl" should read --$_7$-cycloalkyl--;

UNITED STATES PATENT AND TRADEMARK OFFICE
CERTIFICATE OF CORRECTION

PATENT NO. : 4,880,718

DATED : Nov. 14, 1989

INVENTOR(S) : LEYRER et al.

It is certified that error appears in the above-identified patent and that said Letters Patent is hereby corrected as shown below:

Claim 3, col. 24 (continued),
   line 17, "$C_6H_5\text{-CH=CH13}$" should read --$C_6H_5\text{-CH=CH-}$ --.

Claim 5, col. 24,
   line 32, "R14" should read --$R^{14}$--.

Signed and Sealed this

Third Day of September, 1991

*Attest:*

HARRY F. MANBECK, JR.

*Attesting Officer*     *Commissioner of Patents and Trademarks*